US010958899B2

(12) United States Patent
Cheng et al.

(10) Patent No.: US 10,958,899 B2
(45) Date of Patent: Mar. 23, 2021

(54) EVALUATION OF DYNAMIC RANGES OF IMAGING DEVICES

(71) Applicant: Hewlett-Packard Development Company, L.P., Spring, TX (US)

(72) Inventors: Yow-Wei Cheng, Taipei (TW); Emily Ann Miginnis, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/634,106

(22) PCT Filed: Jul. 26, 2017

(86) PCT No.: PCT/US2017/043850
§ 371 (c)(1),
(2) Date: Jan. 24, 2020

(87) PCT Pub. No.: WO2019/022728
PCT Pub. Date: Jan. 31, 2019

(65) Prior Publication Data
US 2020/0213582 A1   Jul. 2, 2020

(51) Int. Cl.
*H04N 17/00* (2006.01)
*H04N 5/235* (2006.01)

(52) U.S. Cl.
CPC ......... *H04N 17/002* (2013.01); *H04N 5/2355* (2013.01)

(58) Field of Classification Search
CPC .... H04N 17/002; H04N 5/2355; H04N 5/235; H04N 5/2353; H04N 5/355; H04N 19/85;
(Continued)

(56) References Cited

U.S. PATENT DOCUMENTS 5,760,829 A * 6/1998 Sussmeier ............ H04N 17/002
                                              348/126
5,875,258 A * 2/1999 Ortyn ............... G01N 35/00594
                                              382/133
(Continued)

FOREIGN PATENT DOCUMENTS

FR        2996034 B1    3/2014

OTHER PUBLICATIONS

Yang, D.X.D. et al., Comparative Analysis of SNR for Image Sensors with Enhanced Dynamic Range, Jan. 1999 < http://isl.stanford.edu/groups/elgamal/abbas_publications/C068.pdf >.

*Primary Examiner* — Brian P Yenke
*Assistant Examiner* — Sean N. Haiem
(74) *Attorney, Agent, or Firm* — Lakshmi Kumaran & Sridharan

(57) ABSTRACT

In an example, a computing device extracts a first pre-defined region of interest (ROI), a second pre-defined ROI, and a third pre-defined ROI from an image captured by the imaging device. Further, a first signal-to-noise ratio (SNR), second SNR, and a third SNR is calculated for the first, the second, and the third pre-defined ROIs respectively. The computing device computes a variance of the first SNR with respect to the second SNR and the third SNR, the second SNR with respect to the third SNR and the first SNR, and the third SNR with respect to the first SNR and the second SNR. Based on the variance, a pre-defined weight is associated with the first SNR, the second SNR, and the third SNR to obtain weighted SNR values. Based on the weighted SNR values, the computing device evaluates the dynamic range of the imaging device.

15 Claims, 4 Drawing Sheets

(58) Field of Classification Search
CPC .. H04N 19/587; H04N 19/527; H04N 19/187; H04N 19/186; H04N 19/537; H04N 19/30; H04N 19/597; H04N 19/80; H04N 19/132; H04N 13/139; G06T 5/50; G06T 5/002; G06T 5/007; G01R 33/385; G01R 33/5608; G01R 33/5615; G01R 33/50; G01R 33/243
USPC ......................................................... 348/187
See application file for complete search history.

(56) References Cited

U.S. PATENT DOCUMENTS

| | | | | |
|---|---|---|---|---|
| 6,066,949 | A * | 5/2000 | Alley | G01R 33/385 324/309 |
| 6,579,238 | B1 * | 6/2003 | Simopoulos | G01S 7/52026 600/443 |
| 7,623,683 | B2 * | 11/2009 | Chen | G06T 5/50 375/240.16 |
| 8,780,210 | B1 * | 7/2014 | Steinberg | H04N 17/004 348/188 |
| 8,934,034 | B2 * | 1/2015 | Nayar | H04N 5/238 348/278 |
| 9,240,049 | B2 * | 1/2016 | Ciurea | G06T 15/20 |
| 9,275,444 | B2 * | 3/2016 | Tsuchiya | G06T 5/008 |
| 9,639,915 | B2 * | 5/2017 | Xu | G06T 5/002 |
| 2007/0242900 | A1 * | 10/2007 | Chen | H04N 5/2355 382/294 |
| 2009/0002530 | A1 * | 1/2009 | Arai | H04N 5/2355 348/294 |
| 2009/0060315 | A1 * | 3/2009 | Harris | G01N 21/951 382/141 |
| 2012/0050474 | A1 * | 3/2012 | Segall | H04N 19/85 348/43 |
| 2013/0336525 | A1 * | 12/2013 | Kurtz | C09D 11/50 382/103 |
| 2014/0375318 | A1 * | 12/2014 | Dagher | G01R 33/385 324/309 |
| 2017/0150028 | A1 * | 5/2017 | Robertson | G06T 5/002 |
| 2020/0267339 | A1 * | 8/2020 | Douady-Pleven | H04N 19/597 |

* cited by examiner

US 10,958,899 B2

EVALUATION OF DYNAMIC RANGES OF IMAGING DEVICES

BACKGROUND

Dynamic range of an imaging device, such as a camera, a scanner, or a webcam, indicates a sensitivity of the imaging device. Dynamic range of an imaging device illustrates the difference between a maximum and a minimum strength of signals that are detectable by the imaging device.

BRIEF DESCRIPTION OF DRAWINGS

The following detailed description references the drawings, wherein.

DETAILED DESCRIPTION

Figure 1:
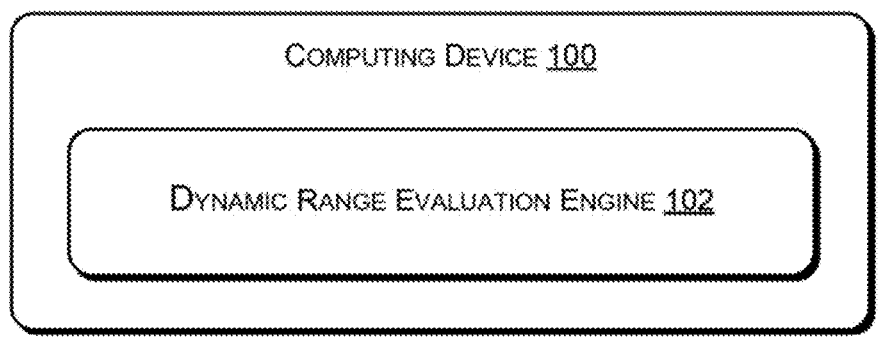
FIG. 1 illustrates a computing device for evaluating a dynamic range of an imaging device, according to an example.

Generally, dynamic range of an imaging device is measured to determine whether the imaging device meets imaging quality demands. Measurement of the dynamic range of the imaging device provides different outcomes when the imaging device is tested as a stand-alone unit compared with when the imaging device is tested as a part of a system. For example, when an imaging device is mounted in a system, an enclosure of the system may increase heat and/or reduce light transmission due to optical signal decay resulting from a material surface positioned before the imaging device. This may introduce noise and consequently may degrade the dynamic range of the imaging device.

The dynamic range is generally evaluated within a testing facility. The imaging device may be mounted on a stand such that the imaging device is able to view a target. To be able to evaluate the dynamic range, the imaging device captures a target image at most 10 times and the dynamic range is computed for every target image. Further, to evaluate the dynamic range, the target image is segmented into no less than 25 grayscale patterns to evaluate the dynamic range. As a result, the target image is designed to be able to accommodate the 25 grayscale patterns, thereby a size of the target image increases. A target image with increased size may increase cost of the testing facility. Moreover, to achieve accurate results, the target image has to be uniformly illuminated. Providing uniform illumination to the target image may add on to the cost of the testing facility. In addition, analysis of at least 25 grayscale patterns may make dynamic range computations complex and time consuming, especially when the computations have to be performed at least 10 times.

The present subject matter describes techniques for evaluating the dynamic range of an imaging device. The techniques of the present subject matter facilitate in evaluating a dynamic range of the imaging device, such as a camera or a scanner, in a faster and accurate manner.

According to an aspect, the imaging device may be associated with multiple fiducials. A fiducial may be an object placed in a field of view of the imaging device and which appears in a target image (hereinafter referred to as an image) produced, for use as a point of reference. The image captured by the imaging device is processed to identify the fiducials within the image. Based on the fiducials, a first, a second, and a third pre-defined region of interest (ROI) are extracted from the image. The ROIs may be specific grayscale patterns defined within the image. Thereafter, for the first, the second, and the third pre-defined ROI, a first, a second, and a third signal-to-noise ratio (SNR) is calculated to compute variance. For example, the variance is computed for the first SNR with respect to the second SNR and the third SNR, the second SNR with respect to the third SNR and the first SNR, and the third SNR with respect to the first SNR and the second SNR. Based on the variance, a pre-defined weight is associated with the first SNR, the second SNR, and the third SNR to obtain weighted SNR values. The pre-defined weight may be a value for being associated with the first SNR, the second SNR, and the third SNR. These weighted SNR values are utilized to perform a linear regression to evaluate the dynamic range of the imaging device.

The dynamic range so evaluated is compared with a pre-defined set of dynamic ranges to determine whether the dynamic range of the imaging device is meeting the imaging quality demands or not. In an example, if the dynamic range so calculated does not meet the imaging quality demands, the above-described procedure of capturing the image and computations may be repeated for up to three to ascertain the dynamic range of the imaging device. The present subject matter further facilitates in evaluating the dynamic range of the imaging device by segmenting the target image in lesser numbers of grayscale patterns. As a result, the computations involved in the evaluation of the dynamic range are reduced. Accordingly, the techniques of the present subject matter are cost-efficient and save on a computation time.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a computing device 100 for evaluating a dynamic range of an imaging device (not shown), according to an example. In an example, the computing device 100 may include a laptop, a smartphone, a tablet, a notebook computer, and the like. Further, the imaging device may include, but is not limited to, a camera and a scanner. The imaging device may be able to capture, store, and manipulate an image.

In one example, the computing device 100 may include a processor and a memory coupled to the processor. The processor may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The memory, communicatively coupled to the processor, can include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories hard disks, optical disks, and magnetic tapes.

The computing device 100 may also include interface(s). The interface(s) may include a variety of interfaces, for example, interfaces for users. The interface(s) may include data output devices. The interface(s) facilitate the communication of the computing device 100 with various communication and computing devices and various communication networks, such as networks that use a variety of protocols, for example, Real Time Streaming Protocol (RTSP), Hypertext Transfer Protocol (HTTP) Live Streaming (HLS) and Real-time Transport Protocol (RTP).

Further, the computing device 100 may include a dynamic range evaluation engine 102 (hereinafter referred to as the evaluation engine 102). The evaluation engine 102, amongst other things, includes routines, programs, objects, components, and data structures, which perform particular tasks or implement particular abstract data types. The evaluation engine 102 may also be implemented as, signal processor(s), state machine(s), logic circuitries, and/or any other device or component that manipulates signals based on operational instructions. Further, the evaluation engine 102 can be implemented by hardware, by computer-readable instructions executed by a processing unit, or by a combination thereof. In one example, the evaluation engine 102 may include programs or coded instructions that supplement the applications or functions performed by the computing device 100.

In an example, the computing device 100 may include data. The data may include a region of interest (ROI) data, a variance data, a dynamic range data, and other data. The other data may include data generated and saved by the evaluation engine 102 for implementing various functionalities of the computing device 100.

In an example, the evaluation engine 102 receives an image captured by the imaging device. The evaluation engine 102 processes the image to extract a plurality of pre-defined ROIs from the image. The plurality of pre-defined ROIs includes a first pre-defined ROI, a second pre-defined ROI, and a third pre-defined ROI. In an example, the plurality of ROIs is defined at the time of designing the image. For instance, the first, the second, and the third ROIs are defined such that the first ROI, the second ROI, and the third ROI has different optical density. Though the present subject matter is explained with reference to the first ROI, the second ROI, and the third ROI, the number of the pre-defined ROIs may vary based on the size of the image and imaging quality demands.

Further, the image device may be associated with fiducials such that the fiducials facilitate in determining a location of the first, the second, and the third pre-defined ROIs in the image. Therefore, to extract the first, the second, and the third pre-defined ROIs, the evaluation engine 102 first identifies a location of the fiducials in the image. To do so, the evaluation engine 102 segments the image into a plurality of black and white pixels based on a thresholding approach. Details pertaining to the thresholding approach are described in conjunction with FIGS. 2A and 2B. Segmentation of the image based on the thresholding approach, results in the fiducials being represented by the black pixels in the image.

Further, to remove any noise from the segmented image, the evaluation engine 102 may perform noise cancellation on the image to identify the black pixels representing the fiducials in an accurate manner. Upon identification of the black pixels, the evaluation engine 102 extracts absolute coordinates of the black pixels. For instance, the absolute coordinates are extracted from a centroid of the black pixels.

Based on the absolute coordinates of the black pixels, the evaluation engine 102 obtains absolute coordinates of the first, the second, and the third pre-defined ROIs. In an example, the evaluation engine 102 obtains the absolute coordinates of the first, the second, and the third pre-defined ROIs by performing an inverse operation of a keystone correction technique on the absolute coordinates of the black pixels. Details pertaining to the inverse operation of the keystone correction technique is described in conjunction with FIG. 2A. In an example, to obtain the absolute coordinates, the evaluation engine 102 obtains relative coordinates of the first, the second, and the third pre-defined ROIs, such as from the memory of the computing device 100. As the first ROI, the second ROI, and the third ROI is pre-defined, the relative coordinates corresponding to the first pre-defined ROI, the second pre-defined ROI, and the third pre-defined ROI are known. Thereafter, the evaluation engine 102 utilizes the relative coordinates of the first, the second, and the third pre-defined ROIs and the absolute coordinates of the black pixels representing the fiducials to obtain the absolute coordinates of the first, the second, and the third pre-defined ROIs. Accordingly, the evaluation engine 102 extracts the first, the second, the third pre-defined ROIs from the image.

Upon extraction of the first, the second, and the third pre-defined ROIs, the evaluation engine 102 calculates a first signal-to-noise ratio (SNR) for the first pre-defined ROI, a second SNR for the second pre-defined ROI, and a third SNR for the third pre-defined ROI. In an example, the first SNR, the second SNR, and the third SNR is calculated based on a luminance channel associated with the first pre-defined ROI, the second pre-defined ROI, and the third pre-defined ROI. For example, the SNR may be, calculated as:

$$SNR = \frac{L^* \text{ mean}}{L^* \text{ stdev}}$$

wherein, $L^*$ is a luminance channel associated with the first pre-defined ROI $L^*$ mean is an average $L^*$ computed based on a size of the first pre-defined ROI, and
$L^*$stdev is the standard deviation of the $L^*$ for the first pre-defined ROI.

The computation of the first SNR, the second SNR, and the third SNR is based on, but is not limited to, a luminance of the image. In an example, the evaluation engine 102 may also compute the first SNR, the second SNR, and the third SNR based on other channel parameters, such as red, blue, or green channels of the image.

Further, the evaluation engine 102 computes a variance of the first SNR with respect to the second SNR and the third SNR, the second SNR with respect to the third SNR and the first SNR, and the third SNR, with respect to the first SNR and the second SNR. In an example, the evaluation engine 102 performs a linear regression of the first SNR, the second SNR, and the third SNR to compute the variance. In another example, the evaluation engine 102 computes the variance between the first SNR, the second SNR, and the third SNR by calculating chain pair distances between the first SNR, the second SNR, and the third SNR. In an example, the evaluation engine 102 stores the, data pertaining to variance of the first SNR, the second SNR, and the third SNR as the variance data in the memory of the computing device 100.

Based on the variance, the evaluation engine 102 associates a pre-defined weight with the first SNR, the second SNR, and the third SNR to obtain weighted SNR values for the first, the second, and the third pre-defined ROIs. In an example, the pre-defined weight may be either 0 or 1. For instance, when deviation of the first SNR is more than the second SNR and the third SNR, a weight of 0 is assigned to the first SNR. Assigning a weight of 0 indicates that the first SNR is considered as noise and is discarded from further computation. The second SNR and the third SNR with less variation is associated with the weight of 1. Although the present subject matter is described with reference to the first pre-defined ROI, the second pre-defined ROI, and the third pre-defined ROI, the pre-defined ROIs may be more in number.

In an example, the evaluation engine 102 performs a linear regression on the weighted SNR values. Based on the linear regression, the evaluation engine 102 identifies the dynamic range of the imaging device. Thereafter, the evaluation engine 102 compares the dynamic range of the imaging device with a pre-defined set of dynamic ranges. If the dynamic range of the imaging device falls within the pre-defined set of dynamic ranges, the evaluation engine 102 generates a success report for the imaging device. The success report indicates that the imaging device meets the imaging quality demands. If the dynamic range of the imaging device does not fall within the pre-defined set of dynamic ranges, the evaluation engine 102 generates a failure report for the imaging device. The failure report indicates that the imaging device does not meet the imaging quality demands. In an example, the evaluation engine 102 stores the dynamic range of the imaging device and the pre-defined set of dynamic ranges as the dynamic range data in the memory of the computing device 100.

In an example, the above described evaluation procedure may be repeated for three target images, to confirm the dynamic range of the imaging device. Accordingly, the computations can be performed quicker. Further, as the present subject matter involves performing computations on smaller set of ROIs, such as the first pre-defined ROI and the second pre-defined ROI, the computations are less complex. Furthermore, a testing facility employed for the present subject matter involves a target image segmented into lesser number of grayscale patterns, accordingly the present subject matter provides a cost-efficient technique for evaluating the dynamic range of the imaging device.

Figure 2A:
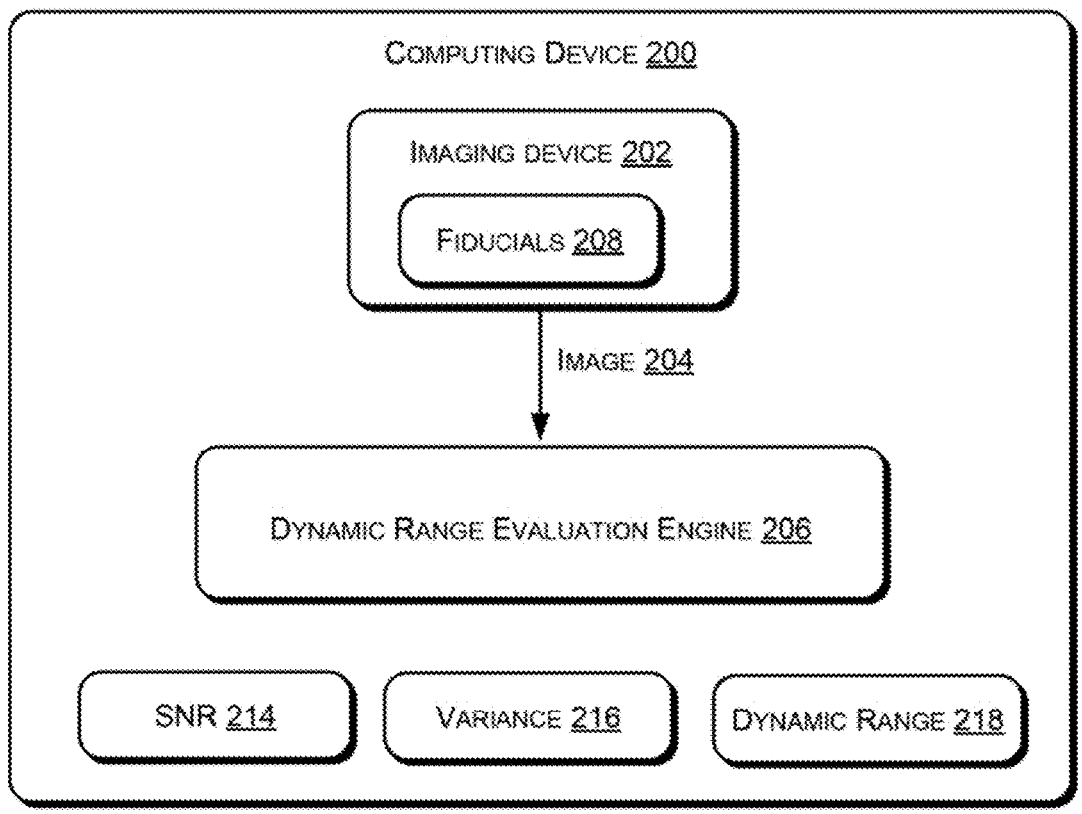
FIG. 2A illustrates a computing device for evaluating a dynamic range of an imaging device, according to an example.
Figure 2B:
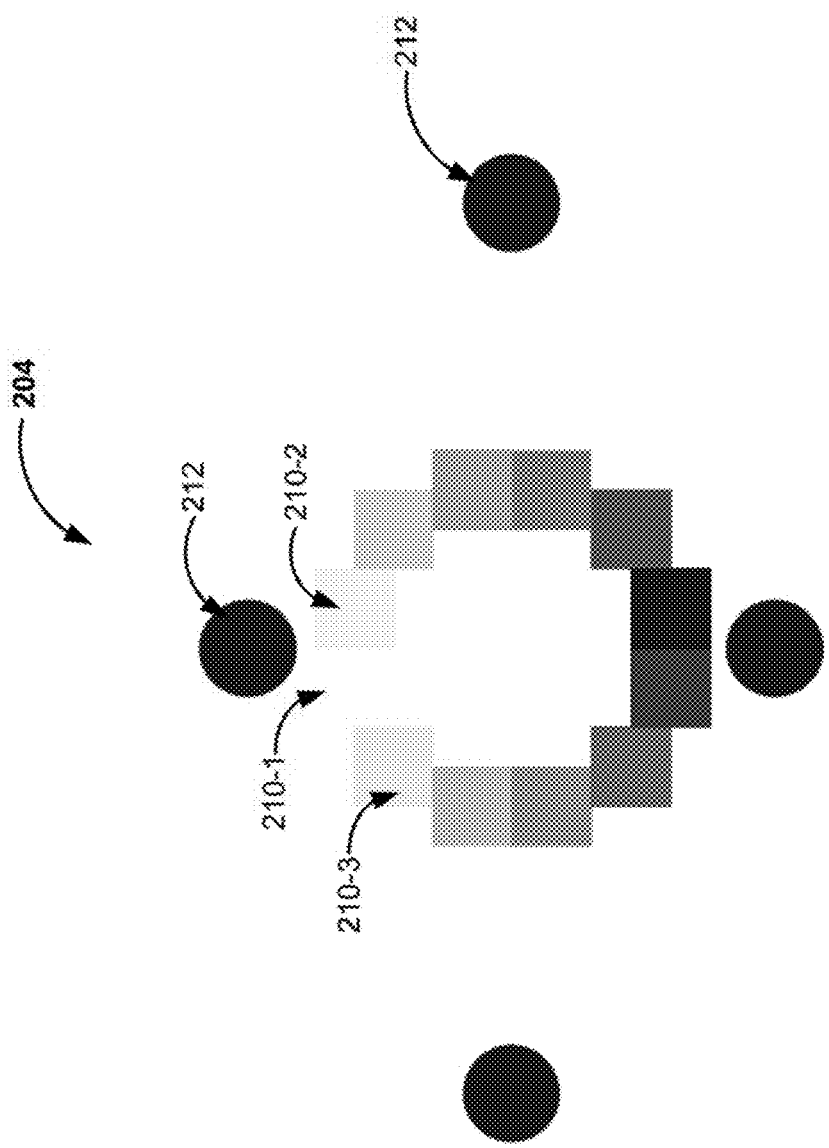
FIG. 2B illustrates a target image for evaluating a dynamic range of an imaging device, according to an example.

The above aspects and further details are described in conjunction with FIGS. 2A and 2B. FIG. 2A illustrates a computing device 200 for evaluating a dynamic range of an imaging device 202 and FIG. 2B illustrates a target image 204 for evaluating a dynamic range of the imaging device 202, according to an example. For the sake of brevity, FIGS. 2A and 2B are described together. The computing device 200 includes the imaging device 202 for capturing the target image 204 (as shown in FIG. 2B) (hereinafter referred to as the image 204). The computing device 200 further includes a dynamic range evaluation engine 206 (hereinafter referred to as the evaluation engine 206). The computing device 200 and the evaluation engine 206 is same as the computing device 100 and the evaluation engine 102 is respectively described through the description of FIG. 1.

The imaging device 202 may include, but is not limited to, a camera, a scanner, and a webcam. Although the imaging device 202 is shown to be integrated within the computing device 200, the imaging device 202 may be located externally to the computing device 200. The imaging device 202 may be coupled to the computing device 200 through a communication link. The communication link may be wireless or a wired communication link. Further, the imaging device 202 is being associated with fiducials 208. In an example, the fiducials 208 may be marks on the imaging device 202 or may be an external component placed in a field of view of the imaging device 202.

The fiducials 208 facilitate in determining location of a plurality of pre-defined regions of interest (ROIs) 210-1, 210-2, . . . , 210-N, captured in the image 204. The plurality of pre-defined ROIs is collectively referred to as pre-defined ROIs 210. The pre-defined ROIs 210 are specific grayscale patterns defined within the image 204. The pre-defined ROIs 210 may include a first pre-defined ROI 210-1, a second pre-defined ROI 210-2, and a third pre-defined ROI 210-3. In an example of the present subject matter, four fiducials may be used for determining the location of the pre-defined ROIs 210 in the image 204. The number of fiducials 208 may be increased or decreased based on a level of accuracy desired from the image 204. In an example, the fiducials 208 may be used to determine how accurately coordinates of the pre-defined ROIs are identified. For example, two fiducials may provide x and y coordinates, three fiducials may be used to perform an Affine transformation, four fiducial may facilitate in performing Projective transformation, or more fiducials to facilitate in lens distortion correction, etc.

The plurality of pre-defined ROIs 210 is defined at the time of designing the image 204 and relative coordinates of the pre-defined ROIs 210 are identified. In an example, the image 204 may include twelve pre-defined ROIs 210. The evaluation engine 206 processes the image 204 to extract the twelve pre-defined ROIs 210. The twelve ROIs are defined based on a set of optical densities. For instance, to select the twelve ROIs, a graph is plotted between the set of optical densities along Y axis and SNR associated with corresponding optical densities from the set of optical densities along X axis. If the graph illustrates a smooth curve, regions corresponding to the set of optical densities are selected as ROIs.

On the other hand, if the curve is not smooth, the optical densities, from the set of optical densities, that lie outside the curve are identified and replaced with higher or lower optical densities. Thereafter, the curve is again plotted to confirm a smooth decay in the curve. In an example, the above-described selection technique is implemented on a set of imaging devices to obtain unbiased set of results. Upon receiving the smooth curve of the optical densities with respect to the SNR, the ROIs are defined in the image 204 which are then used for evaluation of the dynamic range. In an example, the evaluation engine 206 stores data pertaining to the pre-defined ROIs 210, such as number of ROIs, the relative coordinates of the ROIs, and the optical densities as the ROI data in a memory of the computing device 200.

To extract the pre-defined ROIs 210 from the image 204, the evaluation engine 206 first extracts the fiducials 208 associated with the image 204. As mentioned earlier, four fiducials may be used for determining the location of the pre-defined ROIs 210 in the image 204. In operation, upon receiving the mage 204, the evaluation engine 206 processes the image 204 to identify the fiducials 208. For example, the image 204 is processed through a thresholding approach in which the image 204 is segmented in a plurality of pixels. Thereafter, each of the plurality of pixels is replaced with a black pixel or a white pixel based on a grey value of the pixel. The grey value indicates brightness of a pixel. For example, in case of, an 8-bit grayscale image, each grey value, ranges from 0-255. To replace the plurality of pixels with the black pixel and the white pixel, a threshold value of 128 is defined. If the grey value of a pixel exceeds 128, the pixel is replaced with a black pixel. If the grey value of a pixel is below 128, the pixel is replaced with as a white pixel.

Once all the pixels are replaced with white and black pixels, the evaluation engine 206 processes the image 204 to remove noise from the image 204 to identify the black pixels 212 representing the fiducials 208. In an example, the evaluation engine 206 performs noise removal techniques on the image 204. The noise removal techniques may include, but are not limited to, dilation, erosion, and Gaussian blur. In an example, the evaluation engine 206 may also take into consideration a size of the fiducials 208 to identify the black pixels 212 representing the fiducials 208 in the image 204.

Upon identification of the black pixels 212, the evaluation engine 206 extracts absolute coordinates of the black pixels 212. In an example, the fiducials 208 may be circular in shape. Accordingly, the evaluation engine 206 extracts the absolute coordinates of the fiducials 208 from a centroid of the black pixels 212. Although the present subject matter describes the fiducials 208 as circles, the fiducials 208 may be of any shape, such as rectangles, triangles, and bars. In case of rectangles, the evaluation engine 206 may extract the absolute coordinates of the fiducials 208 with respect to corners of the black pixels. Upon extracting the absolute coordinates of the black pixels 212, the evaluation engine 206 retrieves the relative coordinates of pre-defined ROIs 210 from the memory of the computing device 200.

The evaluation engine 206 utilizes the relative coordinates of the pre-defined ROIs 210 and the absolute coordinates of the black pixels 212 to determine the absolute coordinates of the pre-defined ROIs 210. In an example, the absolute coordinates of the pre-defined ROIs 210 are determined by performing an inverse operation of a keystone correction on the absolute coordinates of the black pixels 212 and the relative coordinates of the pre-defined ROIs 210. In an example, the keystone correction is a function that skews an image to make the image rectangular. In the inverse keystone correction, a rectangular image is converted into a trapezoid. The inverse keystone correction enables in obtaining accurate position of the pre-defined ROIs 210 relative to the fiducials 208. In an example, the evaluation engine 206 may apply an Affine transformation to convert the relative coordinates of the pre-defined ROIs 210 and the absolute coordinates of the black pixels 212, into absolute coordinates of the pre-defined ROIs 210. Accordingly, the evaluation engine 206 extracts pre-defined ROIs 210 from the image 204.

Upon extraction of the pre-defined ROIs 210, the evaluation engine 206 calculates a first SNR for the first pre-defined ROI 210-1, a second SNR for the second pre-defined ROI 210-2, and the third SNR for the third pre-defined ROI 210-3. In an example, the first SNR, the second SNR, and the third SNR is calculated based on a luminance of the first pre-defined ROI 210-1, the second pre-defined ROI 210-2, and the third pre-defined ROI 210-3 respectively, In an example, the evaluation engine 206 stores the data pertaining to SNR of the first pre-defined ROI, the second pre-defined ROI, and the third pre-defined ROI as the SNR 214 in the memory of the computing device 200.

Further, the evaluation engine 206 employs the SNR 214 to compute a variance of the first SNR with respect to the second SNR and the third SNR, the second SNR with respect to the third SNR and the first SNR, and the third SNR with respect to the first SNR and the second SNR. The computation of the variance may be indicative of usefulness of the SNR of the pre-defined ROIs 210 for computation of the dynamic range. In an example, the evaluation engine 206 stores the data pertaining to variance of the first SNR, the second SNR, and the third SNR as the variance 216 in the memory of the computing device 200. For example, the evaluation engine 206 performs a linear regression on first SNR, the second SNR, and the third SNR to compute the variance. Accordingly, a regression line is drawn along the first SNR, the second SNR, and the third SNR. Based on the regression line, the evaluation engine 206 determines the variance for the first pre-defined ROI 210-1, the second pre-defined ROI 210-2, and the third pre-defined ROI based on a distance of the first SNR, the second SNR, and the third SNR from the regression line.

In another example, the evaluation engine 206 calculates chain pair distances between the first SNR, the second SNR, and the third SNR to compute the variance. In this case, the evaluation engine 206 plots the first SNR, the second SNR, and the third SNR with respect to each other. Thereafter, the evaluation engine 206 computes a distance of the first SNR with respect to the second SNR, the first SNR with respect to the third SNR, and the second SNR with respect to the third SNR. The pre-defined ROI having SNR with the largest distance from SNR of other ROIs is considered as noise by the evaluation engine 206.

Based on the variance, the evaluation engine 206 associates a pre-defined weight with the first SNR, the second SNR, and the third SNR to obtain weighted SNR values. In an example, the pre-defined weight may be either 0 or 1. For example, if the first SNR indicates huge variation from the regression line, the evaluation engine 206 associates zero weight to the first SNR. Based on the weighted SNR values, the evaluation engine 206 evaluates a dynamic range of the imaging device 202. For example, the evaluation engine 206 performs a linear regression on the weighted SNR values to obtain the dynamic range. Upon obtaining the dynamic range, the evaluation engine 206 compares the dynamic range of the imaging device 202 with a pre-defined set of dynamic ranges. Based on the comparison, the evaluation engine 206 indicates whether the imaging device 202 meets the imaging quality demands or not. In an example, the evaluation engine 206 stores the dynamic range so computed as the dynamic range 218 in the memory of the computing device 200.

The above-described procedure for evaluating the dynamic range may be repeated to confirm the dynamic range of the imaging device 202. In an example, three repetitions of the, evaluation procedure provide consistent results pertaining to the dynamic range. Further, the present subject matter facilitates in evaluating high dynamic range (HDR) of imaging devices, such as the imaging device 202. The above-described procedure enhances image contrast of an, image even when a HDR feature is turned off in the imaging device.

Figure 3:
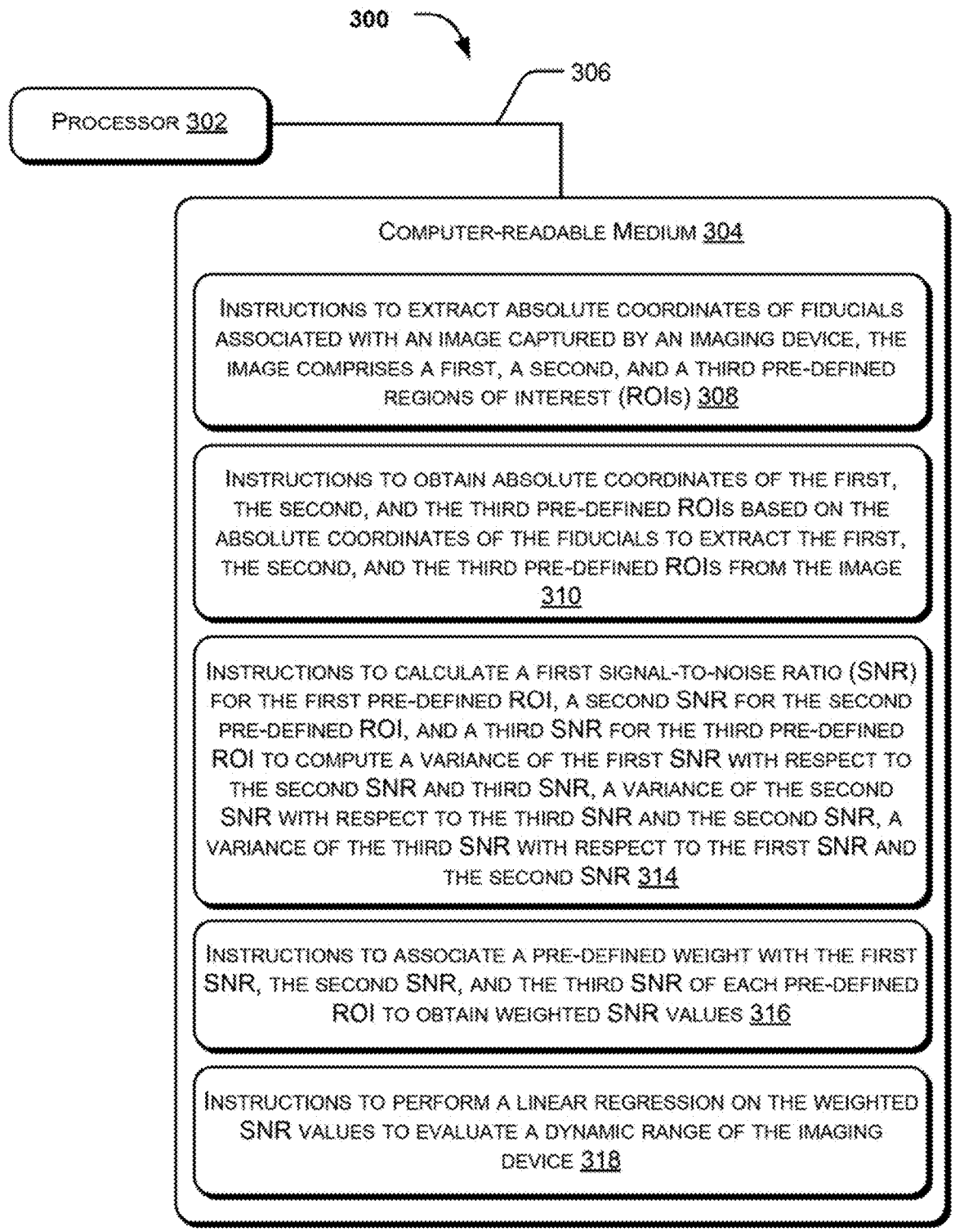
FIG. 3 illustrates a system environment implementing a non-transitory computer readable medium for evaluating a dynamic range of an imaging device, according to an example.

FIG. 3 illustrate a system environment 300 implementing a non-transitory computer readable medium for evaluating a dynamic range, according to an example. The system environment 300 includes a processor 302 communicatively coupled to the non-transitory computer-readable medium 304 through a communication link 306. In an example, the processor 302 may be a processor of a computing device for fetching and executing computer-readable instructions from the non-transitory computer-readable medium 304.

The non-transitory computer-readable medium 304 can be, for example, an internal memory device or an external memory device. In an example, the communication link 306 may be a direct communication link, such as any memory read/write interface. In another example, the communication link 306 may be an indirect communication link, such as a network interface. In such a case, the processor 302 can access the non-transitory computer-readable medium 304 through a communication network (not shown).

In an example, the non-transitory computer-readable medium 304 includes a set of computer-readable instructions for printing on the print medium. The set of computer-readable instructions may include instructions as explained in conjunction with FIGS. 1-2B. The set of computer-readable instructions can be accessed by the processor 302 through the communication link 306 and subsequently executed to perform acts for evaluating the dynamic range of an image.

Referring to FIG. 3, in an example, the non-transitory computer-readable medium 304 may include instructions 308 to extract absolute coordinates of fiducials associated with an image captured by an imaging device. The image may include a first pre-defined region of interest (ROI), a second pre-defined ROI, and a third pre-defined ROI. The fiducials may act as reference points to determine, a location of the first pre-defined ROI, the second pre-defined ROI, and the third pre-defined ROI. In an example, the image may be processed using a threshold approach. As a result, a location of the fiducials may be identified in the image.

The non-transitory computer-readable medium 304 may include instructions 310 to obtain relative coordinates of the first, the second, and the third pre-defined ROI based on the absolute coordinates of the fiducials. The relative coordinates along with the absolute coordinates of the fiducials define a boundary of the image. Further, the non-transitory medium 304 may include instructions 312 to transform the relative coordinates of the first, the second, and the third pre-defined ROI into absolute coordinates of the first, the second, and the third pre-defined ROIs to extract the first, the second, and the third pre-defined ROIs from the image.

The non-transitory medium 304 may further include instructions 314 to calculate a first signal-to-noise ratio (SNR) for the first pre-defined ROI, a second SNR for the second pre-defined ROI, and a third SNR for the third pre-defined ROI. Thereafter, a variance of the first SNR is computed with respect to the second SNR and the third SNR, the second SNR with respect to the third SNR and the first SNR, and the third SNR with respect to the first SNR and the second SNR. In addition, the non-transitory medium 304 may include instructions 316 to associate a pre-defined weight with the first SNR, the second SNR, and the third SNR to obtain weighted SNR values. In an example, the pre-defined weight may be between 0 and 1 and may be based on the variation between the first SNR, the second SNR, and the third SNR. The non-transitory medium 304 may further include instructions 318 to perform a linear regression on the weighted SNR values to evaluate a dynamic range of the imagine device. Although the present figure is described with reference to the first pre-defined ROI and the second pre-defined ROI, the pre-defined ROIs may be more in number.

In addition, the non-transitory computer-readable medium 304 may include instructions to obtain the absolute coordinates of the first, the second, and the third pre-defined ROIs by performing an inverse operation of a keystone correction on the absolute coordinates of the fiducials. The non-transitory computer-readable medium 304 may further include instructions to cause the processor to segment the image into the first, the second, and the third pre-defined ROIs such that the first, the second, and the third pre-defined ROI corresponds to a different optical density.

Although examples of the present disclosure have been described in language specific to methods and/or structural features, it is to be understood that the present disclosure is not limited to the specific methods or features described. Rather, the methods and specific features are disclosed and explained as example of the present disclosure.

We claim:
1. A computing device comprising;
a dynamic range evaluation engine, to,
extract a plurality of pre-defined regions of interest (ROIs) from an image captured by an imaging device, the plurality of pre-defined ROIs comprises a first pre-defined ROI, a second pre-defined ROI, and a third pre-defined ROI;
calculate a first signal-to-noise ratio (SNR) for the first pre-defined ROI, a second SNR for the second pre-defined ROI, and a third SNR for the third pre-defined ROI;
compute a variance of the first SNR with respect to the second SNR and the third SNR, a variance of the second SNR with respect to the first SNR and the third SNR, and a variance of the third SNR with respect to the first SNR and the second SNR;
based on the variance, associate a pre-defined weight with the first SNR, the second SNR, and the third SNR to obtain weighted SNR values; and
perform linear regression on the weighted SNR values to evaluate the dynamic range of the imaging device.

2. The computing device as claimed in claim 1, wherein the dynamic range evaluation engine is to:
compare the dynamic range of the imaging device with a pre-defined set of dynamic ranges; and
generate a success report when the dynamic range of the imaging device falls within the pre-defined set of dynamic ranges.

3. The computing device as claimed in claim 1, wherein to extract the plurality of pre-defined ROIs, the dynamic range evaluation engine is to:
identify fiducials associated with the image;
upon identification of the fiducials, extract absolute coordinates of the fiducials;
obtain absolute coordinates of the plurality of pre-defined ROIs, based on the absolute coordinates of the fiducials.

4. The computing device as claimed in claim 3, wherein to identify the fiducials, the dynamic range evaluation engine is to segment the image into a plurality of pixels.

5. The computing device as claimed in claim 3, wherein to obtain the absolute coordinates of the plurality of pre-defined ROIs, the dynamic range evaluation engine is to perform an inverse operation of a keystone correction on the absolute coordinates of the fiducials.

6. The computing device as claimed in claim 4, wherein to segment the image, the dynamic range evaluation engine is to divide the image into the first, the second, and the third pre-defined ROIs such that the first, the second, and the third pre-defined ROIs corresponds to a different optical density.

7. A computing device comprising:
an imaging device for capturing an image of a target image, the imaging device being associated with fiducials;
a dynamic range evaluation engine, to,
- receive the image captured by the imaging device;
- obtain absolute coordinates of the fiducials;
- based on the absolute coordinates of the fiducials, extract a plurality of pre-defined regions of interest (ROIs) from the image, the plurality of pre-defined ROIs comprises a first pre-defined ROI, a second pre-defined ROI, and a third pre-defined ROI;
- calculate a first signal-to-noise ratio (SNR) for the first pre-defined ROI, a second SNR for the second pre-defined ROI, and a third SNR for the third pre-defined ROI to compute a variance of the first SNR with respect to the second SNR and the third SNR, a variance of the second SNR with respect to the third SNR and the first SNR, and a variance of the third SNR with respect to the first SNR and the second SNR;
- based on the variance, associate a pre-defined weight with the first SNR, the second SNR, and the third SNR to obtain weighted SNR values; and
- evaluate a dynamic range of the imaging device based on the weighted SNR values.

8. The computing device as claimed in claim 7, wherein the dynamic range evaluation engine is to,
to obtain absolute coordinates of the plurality of pre-defined ROIs, based on the absolute coordinates of the fiducials, to extract the plurality of pre-defined ROIs.

9. The computing device as claimed in claim 7, wherein the dynamic range evaluation engine is to determine the first SNR, the second SNR, and the third SNR based on a brightness of the first pre-defined ROI, the second pre-defined ROI, and the third pre-defined ROI respectively.

10. The computing device as claimed in claim 7, wherein the dynamic range evaluation engine is to perform a linear regression to determine the variance of the first SNR with respect to the second SNR and the third SNR, the second SNR with respect to the third SNR and the first SNR, and the third SNR with respect to the first SNR and the second SNR.

11. The computing device as claimed in claim 7, wherein the dynamic range evaluation engine is to compute a chain pair distance to determine the variance of the first SNR with respect to the second SNR and the third SNR, the second SNR with respect to the third SNR and the first SNR, and the third SNR with respect to the first SNR and the second SNR.

12. The computing device as claimed in claim 7, wherein the dynamic range evaluation engine is to segment the image into the first, the second, and the third pre-defined ROIs such that the first, the second, and the third pre-defined ROIs corresponds to a different optical density.

13. A non-transitory computer-readable medium comprising computer-readable instructions, which, when executed by a processor of a computing device, cause the processor to:
- extract absolute coordinates of fiducials associated with an image captured by an imaging device, wherein the image comprises a first, a second, and a third pre-defined regions of interest (ROIs);
- obtain absolute coordinates of the first, the second, and the third pre-defined ROI based on the absolute coordinates of the fiducials to extract the first, the second, and the third pre-defined ROIs from the image;
- calculate a first signal-to-noise ratio (SNR) for the first pre-defined ROI, a second SNR for the second pre-defined ROI, and a third SNR for the third pre-defined ROI to compute a variance of the first SNR with respect to the second SNR and the third SNR, a variance of the second SNR with respect to the third SNR and the first SNR, and a variance of the third SNR with respect to the first SNR and the second SNR;
- based on the variance, associate a pre-defined weight with the first SNR, the second SNR, and the third SNR to obtain weighted SNR values; and
- perform a linear regression on the weighted SNR values to evaluate a dynamic range of the imaging device.

14. The non-transitory computer-readable medium as claimed in claim 13, wherein the instructions which, when executed by the processor, cause the processor to obtain the absolute coordinates of the first, the second, and the third pre-defined ROIs by performing an inverse operation of a keystone correction on the absolute coordinates of the fiducials.

15. The non-transitory computer-readable medium as claimed in claim 13, wherein the instructions which, when executed by the processor, cause the processor to segment the image into the first, the second, and the third pre-defined ROIs such that the first, the second, and the third pre-defined ROIs corresponds to a different optical density.

* * * * *